United States Patent [19]

Eigler et al.

[11] Patent Number: 5,229,943
[45] Date of Patent: Jul. 20, 1993

[54] CONTROL UNIT FOR A PASSENGER RESTRAINT SYSTEM AND/OR PASSENGER PROTECTION SYSTEM FOR VEHICLES

[75] Inventors: Jürgen Eigler; Reinhard Weber, both of Regensburg, Fed. Rep. of Germany

[73] Assignee: Siemens Aktiengesellschaft, Munich, Fed. Rep. of Germany

[21] Appl. No.: 763,125

[22] Filed: Sep. 20, 1991

[30] Foreign Application Priority Data

Mar. 20, 1989 [DE] Fed. Rep. of Germany ....... 3909080
Feb. 19, 1990 [WO] PCT Int'l Appl. .................. PCT/DE90/00110

[51] Int. Cl.$^5$ ............................................. B60R 21/00
[52] U.S. Cl. .............................. 364/424.05; 280/735; 307/10.1; 340/436; 180/282
[58] Field of Search .................. 364/424.05; 340/436, 340/438; 307/9.1, 10.1; 180/232, 271, 282; 280/728, 734, 735

[56] References Cited

U.S. PATENT DOCUMENTS

| | | | |
|---|---|---|---|
| 3,762,495 | 10/1973 | Usui et al. | 280/735 |
| 3,851,305 | 11/1974 | Baba et al. | 180/274 |
| 4,287,765 | 9/1981 | Kreft | 73/517 R |
| 4,701,628 | 10/1987 | Kumasaka et al. | 280/735 |
| 4,804,859 | 2/1989 | Swart | 280/735 |
| 4,836,024 | 6/1989 | Woehrl et al. | 280/735 |
| 4,864,202 | 9/1989 | Nitschke et al. | 280/735 |
| 4,933,570 | 6/1990 | Swart et al. | 280/735 |
| 4,994,972 | 2/1991 | Diller | 180/271 |
| 5,021,678 | 6/1991 | Diller | 280/734 |
| 5,040,118 | 8/1991 | Diller | 180/282 |
| 5,101,115 | 3/1992 | Nitschke et al. | 280/735 |
| 5,109,341 | 4/1992 | Blackburn et al. | 280/735 |

FOREIGN PATENT DOCUMENTS

8807461 10/1988 Int'l Pat. Institute .

*Primary Examiner*—Gary Chin
*Attorney, Agent, or Firm*—Herbert L. Lerner; Laurence A. Greenberg

[57] ABSTRACT

A control unit for a passenger restraint and/or protection system for vehicles includes a sensor for generating an electronic analog output signal corresponding to accelerations or decelerations. An evaluation circuit determines if threshold values are exceeded. A tripping circuit trips a passenger-protection component if a threshold value is exceeded. Each sensor output signal is subjected to evaluations by supplying the signal to the evaluation circuit. Each evaluation circuit evaluates a temporal course by different criteria and by differently defined threshold values. The evaluation circuit uses typical characteristics of the temporal course and a definition of the threshold value to distinguish between accidents of at least two different types. The evaluation circuit ascertains the severity of the type of accident individually assigned to it from typical characteristics of the temporal course and from a definition for a threshold value. A logical linkage element links applicable evaluation outcomes and supplies a linkage outcome to the tripping circuit. The linkage element has a logical linking function tripping the system only if evaluations by the criteria show a defined type of accident, and that the threshold value having been specifically assigned to the applicable type of accident has been exceeded. The evaluation circuit ascertains an optimal tripping instant, differing from an instant at which exceeding of the tripping threshold value is ascertained.

16 Claims, 1 Drawing Sheet

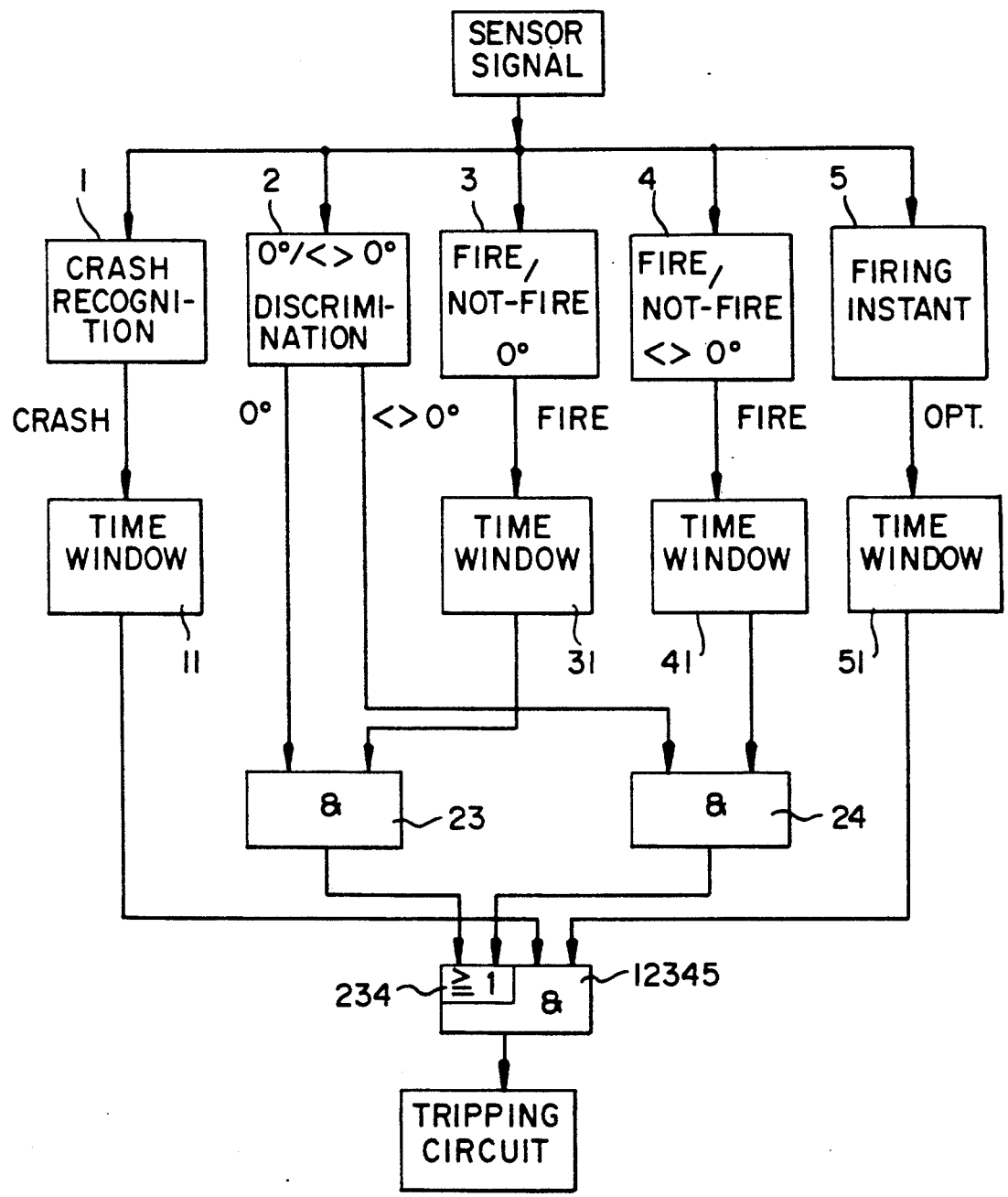

CONTROL UNIT FOR A PASSENGER RESTRAINT SYSTEM AND/OR PASSENGER PROTECTION SYSTEM FOR VEHICLES

CROSS-REFERENCE TO RELATED APPLICATION

This application is a continuation of International Application PCT/DE90/00110, filed Feb. 19, 1990.

BACKGROUND OF THE INVENTION

Field of the Invention

The invention relates to a control unit for a passenger restraint system and/or passenger protection system for vehicles, for instance, for an air bag and/or belt tensioner and/or collapsible roll bar, including:

one or more acceleration or deceleration sensors, such as a sensor having a piezoresistive sensor element, which generate an electronic, analog output signal, and/or an originally analog sensor output signal digitized by an analog/digital converter, corresponding to the acceleration or deceleration acting upon the applicable installation site in the vehicle, so that the course of the sensor output signal over time corresponds to the applicable course of the accelerations or decelerations, one or more evaluation circuits that evaluate the sensor output signal or signals, above all with a view to whether or not threshold values are exceeded, and a tripping circuit, which trips one or more passenger-protection components of the system if one or more threshold values are exceeded, wherein the sensor output signals are each subjected to a plurality of different evaluations, in that the sensor output signals are supplied to an evaluation circuit of complex operation or to a plurality of evaluation circuits operating differently from one another, each of which evaluate the temporal course by different criteria and thus evaluate them by a plurality of differently defined threshold values, at least one of these evaluation circuits is constructed and operated in such a way that, from typical characteristics of the temporal course supplied to it and from the definition of the threshold value assigned to it, it distinguishes at least two different types of accidents from one another, for instance head-on and oblique, broadside and/or rear-end, to which types differently defined threshold values for the severity of the accident are assigned, at least one of these evaluation circuits is constructed and operated in such a way that from typical characteristics of the temporal course supplied to it and from the definition or definitions assigned individually to it for the threshold value or values, it ascertains the severity of the type of accident individually assigned to it, outputs of the evaluation circuit or circuits are connected to inputs of at least one logically linking linkage element, which links the applicable evaluation outcomes and which supplies its linkage outcome from its output to the tripping circuit, and the logical linking function of the linkage element or elements is selected in such a way that the system is tripped only if the evaluations by the various criteria showed both a defined type of accident from a plurality of defined accident types, and that the threshold value or values that have been specifically assigned to the applicable type of accident have been exceeded.

Such a device is known from German Published, Non-Prosecuted Application DE-A 2 123 359, corresponding to U.S. Pat. No. 3,762,495.

In order to improve or optimize the reliability of the control unit, namely to increase the certainty that mistaken tripping of the system will be avoided, the known control unit already has a plurality of circuits, which use various threshold values based on characteristic features of the sensor output signal to ascertain more or less accurately which type of accident, such as head-on collision or broadside crash, is involved, and how critically the decelerations or accelerations being measured are to be evaluated. Above all, in the initial phase of the accident, which is definitive for the evaluation, the courses of the sensor output signals over time differ more or less markedly from one another, so that they allow a conclusion to be drawn more or less not only as to the type of accident but also as to the incipient severity of the accident, even in the initial phase.

SUMMARY OF THE INVENTION

It is accordingly an object of the invention to provide a control unit for a passenger restraint system and/or passenger protection system for vehicles, which overcomes the hereinafore-mentioned disadvantages of the heretofore-known devices of this general type, and which exploits the fact that the course over time of the sensor output signal depends strongly on the type of accident involved, for instance whether it is a head-on collision or an oblique collision, i.e. one with impact at an angle. It is in fact not sufficient to ascertain, by means of only a single threshold value, merely whether the steepness or amplitude or integral of the sensor output signal, for instance, exceeds an associated threshold value.

In the aforementioned prior art, different evaluations are accordingly made, each of the evaluations is dimensioned with a view to a specific decision, and finally all the evaluations are logically linked. Each individual evaluation can be optimized in view of the specific requirements made of it, independently of the other evaluations.

Such various evaluations and optimizations exist in the invention as well. As a result, the advantages associated with them are also attainable with the invention. The invention accordingly also makes it possible to improve or optimize reliability or safety by ascertaining both the type of accident and the associated severity of the accident, as a result of which the probability of mistaken tripping of the system and the likelihood of unnecessary tripping during a harmless accident are already reduced, because tripping such a system is intrinsically associated with additional danger to the passengers, such as hearing damage and temporary loss of steering, and moreover entails subsequent repair costs.

Accordingly the invention should not only make it possible before tripping:

to ascertain what type of accident is in fact involved;

to assure that the accident if applicable is indeed severe enough that tripping of the system is justified despite the dangers and expense associated with tripping, and to assure that tripping is not effected on the basis of a sensor output signal that in no way corresponds to an accident.

The invention should in fact additionally make it possible to ascertain the most optimal possible instant for tripping the system, from the course of the sensor output signal or signals, independently of the instant at which the exceeding of threshold values is ascertained.

The invention proceeds namely from the finding that in an accident, the system should not always be tripped. On the contrary, the system should often be tripped at other instants, at the right time. Activating the system too soon provides inadequate protection in the later phase of the accident, and activating it too late presents additional danger to the passengers, because they will already have shifted forward relative to the passenger compartment as a result of the accident.

With the foregoing and other objects in view there is provided, in accordance with the invention, a control unit for a passenger restraint and/or protection system for vehicles, comprising:

at least one acceleration or deceleration sensor for generating at least one electronic analog output signal corresponding to accelerations or decelerations acting upon an applicable installation site in a vehicle, the at least one sensor output signal having a course over time corresponding to the applicable course of the accelerations or decelerations, at least one evaluation circuit having outputs and having an input connected to the at least one acceleration or deceleration sensor for evaluating the at least one sensor output signal to determine if threshold values are exceeded, a tripping circuit for tripping at least one passenger-protection component of the system if at least one threshold value is exceeded, means for subjecting each of the at least one sensor output signal to a plurality of different evaluations by supplying the at least one sensor output signal to at least one of the at least one evaluation circuit, each of the at least one evaluation circuit having means for evaluating a temporal course by different criteria and by a plurality of differently defined threshold values, at least one of the at least one evaluation circuit having means for using typical characteristics of the temporal course supplied to it and a definition of the threshold value assigned to it to distinguish between accidents of at least two different types to which differently defined threshold values for the severity of the accident are assigned, at least one of the at least one evaluation circuit having means for ascertaining the severity of the type of accident individually assigned to it from typical characteristics of the temporal course supplied to it and from at least one definition for at least one threshold value assigned individually to it, at least one logically linking linkage element having inputs connected to the outputs of the at least one evaluation circuit for linking applicable evaluation outcomes and having an output supplying a linkage outcome to the tripping circuit, the at least one linkage element having a logical linking function tripping the system only if evaluations by the various criteria show both a defined type of accident from a plurality of defined accident types, and that the at least one threshold value having been specifically assigned to the applicable type of accident has been exceeded, and at least one of the at least one evaluation circuit having means for ascertaining an optimal tripping instant, differing from an instant at which exceeding of the tripping threshold value is ascertained.

In accordance with another feature of the invention, the at least one passenger-protection component of the system is selected from the group consisting of an air bag, a belt tensioner and a collapsible roll bar.

In accordance with a further feature of the invention, the at least one acceleration or deceleration sensor has a piezo-resistive sensor element.

In accordance with an added feature of the invention, the at least one acceleration or deceleration sensor has an analog/digital converter for digitizing an originally analog sensor output signal.

In accordance with an additional feature of the invention, at least one of the at least one evaluation circuit performs a complex operation, and the sensor signal subjecting means supplies the at least one sensor output signal to the evaluation circuit performing a complex operation.

In accordance with yet another feature of the invention, the sensor signal subjecting means supplies the at least one sensor output signal to a plurality of the evaluation circuits operating differently from one another.

In accordance with yet a further feature of the invention, the distinguishing means distinguishes between accidents selected from the group consisting of head-on, oblique, broadside and rear-end accidents.

According to the invention, the course of the sensor output signal or signals over time is accordingly first analyzed in accordance with various criteria. Each of these criteria is based on a threshold value that is defined mathematically differently from the others. The definitive criterion for tripping the system is finally ascertained by logical linkage of the various outcomes of evaluation. Above all, however, the invention makes it possible not to link the decision on the tripping instant closely, in terms of time, to the decision as to whether or not the tripping should be initiated, but rather to shift the timing of the tripping as well. Accordingly, the invention makes it possible to fire the passenger restraint or protection system installed in the vehicle at the most optimal possible instant in the event of an accident.

In accordance with yet an added feature of the invention, at least one of the at least one linkage element is at least one AND gate. This is done to assure that tripping can actually be initiated only whenever the AND-linked various evaluations seek to trip the system, on the condition that other evaluations seek to trip the system, and on the condition that other evaluations do not in turn definitively prevent tripping of the system.

In accordance with yet an additional feature of the invention, at least one of the at least one evaluation circuit has means for distinguishing signal courses typical of an accident from other signal courses by using the temporal course, and means for enabling the evaluation outcome of at least one other of the at least one evaluation circuit to be passed on to the tripping circuit through the at least one AND gate. These features are used to prevent tripping of the system whenever the applicable evaluation shows that the disturbance was only one not associated with an accident, such as potholes, engine misfiring, overly sudden clutch engagement, a loose connection in the sensor, and so forth.

In accordance with again another feature of the invention, at least one of the at least one linkage element is an OR gate for sending outcomes of evaluation to the tripping circuit in OR-linked form permitting the system to be alternatively tripped by all OR-linked evaluation outcomes. This is done to make tripping of the system alternatively dependent on outcomes of evaluation.

In accordance with again a further feature of the invention, there is provided at least one timing element connected downstream of at least one of the at least one evaluation circuit, the tripping circuit being connected to the at least one timing element for permitting tripping and feeding of the output signal of the applicable evaluation circuit to the tripping circuit only within certain time windows. This feature makes it possible to define time windows in which the evaluation outcome signals generated by the applicable evaluations can be passed on to the tripping circuit, in order to avert mistaken tripping, namely at the wrong times, such as upon impact on a slender tree that will break and give way as a result of the impact.

In accordance with a concomitant feature of the invention, the at least one evaluation circuit and/or the at least one timing circuit and/or the at least one logical linkage element are part of at least one suitably memory-programmed computer. This is done in order to achieve the object of the invention in a particularly elegant way, with little hardware expense, and in a way that is flexibly adaptable to many types of vehicles.

Other features which are considered as characteristic for the invention are set forth in the appended claims.

Although the invention is illustrated and described herein as embodied in a control unit for a passenger restraint system and/or passenger protection system for vehicles, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawing.

BRIEF DESCRIPTION OF THE DRAWING

The drawing is a block circuit diagram of an exemplary embodiment of the invention.

DESCRIPTION OF THE PREFERRED EMBODIMENT

For the sake of simplicity, the illustrated example includes five separate evaluation circuits, each of which analyzes the course over time of the sensor output signal in accordance with different criteria and thus in accordance with a different definition of a threshold value. Some of these evaluation circuits may even intrinsically use a plurality of threshold values, for instance a lower threshold and an upper threshold, in order to allow window-like tripping conditions, that is for tripping within a given tolerance range.

Referring now to the single figure of the drawing in detail, it is seen that in the example shown in the drawing, the following four requirements were made of evaluation circuits 1-5 in blocks bearing the same reference numerals, for purposes of example:

1. Recognition of typical accident-related signal courses of a sensor output signal by means of the evaluation circuit 1;

2. Recognition of various accident types from the sensor output signal by means of the evaluation circuit 2;

3. Ascertainment by means of the evaluation circuits 3 and 4 that a tripping threshold has been exceeded, with the evaluation of each circuit being configured especially for a certain type of accident, in this case a head-on collision for the evaluation circuit 3 and an oblique collision for the evaluation circuit 4; and 4. Ascertainment of an optimal instant for tripping the system, while taking empirically ascertained values for shifting forward of the passengers and an idle time in tripping the system into account, by means of the evaluation circuit 5.

The exemplary embodiment shown in the drawing has the following five parallel evaluation circuits:

The evaluation circuit 1 for distinguishing typical accident-related signal courses of the sensor output signal from other types of sensor output signals;

The evaluation circuit 2 for distinguishing between head-on and oblique-collision types of accidents;

The evaluation circuit 3 for ascertaining whether or not the tripping threshold for a head-on collision has been exceeded;

The evaluation circuit 4 for ascertaining whether or not the tripping threshold for an oblique collision has been exceeded; and The evaluation circuit 5 for ascertaining an optimal instant for tripping the given system, while taking empirically ascertained values for shifting forward of the passengers and the idle time in tripping the system into account.

The logic linkages shown in the drawing correspond to the aforementioned requirements 1-4 made of the evaluation circuits 1-5, which will be addressed in greater detail somewhat later herein.

First, some important functions of the components, that are shown by way of example in the form of a circuit diagram, will be described in detail, and then the cooperation among all of these evaluation circuits 1-5 will be described in detail.

A "Sensor Signal" block in this case includes at least a single sensor, for instance an electronic sensor, preferably with an analog output signal. The acceleration or deceleration is measured continuously at the site in the vehicle where the sensor is installed through the use of this electronic sensor. The sensor may be constructed as a piezoelectric sensor, which produces an output voltage proportional to the acceleration or deceleration. The output signal of the sensor is amplified enough to obtain a useful operating range. Any zero point fluctuations and other low-frequency interference are filtered out, for instance through a band-pass filter connected to the output side of the sensor in the block. Thus prepared, the output signal of the sensor can be transferred to the parallel-connected evaluation circuits 1-5. Given digital processing in these circuits 1-5, a conversion into the digital form can be performed beforehand, for instance while still in the "Sensor Signal" block, by means of an analog/digital converter.

The block 1, "Crash Recognition", is the first evaluation circuit provided in the example. The first evaluation circuit produces an output signal at its output that indicates the presence of a course of acceleration or deceleration typical of an accident or crash. Such courses which are typical of accidents are in general sensor output signals that indicate negative accelerations that moreover begin suddenly, that are present for a predetermined time, but that do not have overly high amplitudes overly fast. Sensor output signals that only briefly indicate negative (or positive) acceleration more likely point to spurious signals, or hitting a bump or a pothole, and should therefore not activate the tripping circuit. Sensor output signals that assume a high amplitude very fast likewise more likely indicate damage to the sensor, for example. This check for characteristics that are atypical of accidents is preferably carried out by the evaluation circuit 1 by means of a large number of various, defined threshold values.

The block 2, "Discrimination", which distinguishes between a head-on and an oblique collision is the second evaluation circuit provided in the example. From typical, empirically ascertained characteristics of the course of acceleration or deceleration, it recognizes whether a head-on or oblique collision on the part of the vehicle is occurring. This distinction is necessary, in order to provide different tripping thresholds for the restraint or protection system for both types of accidents. This block 2 accordingly makes it possible to take the various properties and risks of injury of both types of accidents into account. If a plurality of sensors with different directional orientations is not provided in the "Sensor Signal" block, having output signals which are sent separately to the evaluation circuits or at least to the evaluation circuit 2, in other words if only a single sensor is provided in the "Sensor Signal" block, then the faster increase in deceleration in a head-on accident can, for instance, be used as a typical distinguishing characteristic. The block 2 could thus include a band-pass filter, for instance, followed by a threshold value switch with hysteresis.

The block 3, "Fire/Not-fire", which determines if a head-on collision tripping threshold been exceeded, is the third evaluation circuit provided in the example. It checks the sensor output signal to determine whether or not the specific tripping threshold of the system for a head-on collision has been exceeded in a crash. This threshold may, for instance, be defined by the minimum speed of the vehicle immediately prior to the crash. If this minimum speed is not measured directly with the sensor, or one of the sensors, then individual characteristics of the acceleration or deceleration signal of the sensor during the crash can also be employed for defining the threshold value, and even for estimating the speed before the crash. It is in fact appropriate to define a tripping threshold typical of a certain type of accident, because tripping should occur only if it is actually necessary. For instance, the severity of a crash is can be recognized from how pronounced the deceleration or acceleration of the vehicle is, and on how long it has thus far lasted. The block 3 could thus include a threshold value switch followed by an integrator.

The block 4, which is also labeled "Fire/Not-fire" and determines if an oblique collision tripping threshold has been exceeded, is the fourth evaluation circuit provided in the example. It works analogously to the corresponding block 3 for the head-on collision, but takes into account the empirically ascertainable, typical course over time in an oblique collision, or in other words it also takes into account the particular vehicle properties in an oblique collision.

Since the outcomes of the evaluations in blocks 3 and 4 are linked with the outcome of the evaluation in block 2 by means of AND gates 23 and 24, the example shown could be converted in size to a different variant according to the invention, by having the blocks 2, 3 and 4, and even the gates 23 and 24, form a single evaluation circuit of correspondingly complex construction, which uses differently defined threshold values in order to carry out the same checks of the course of the sensor output signal over time.

The block 5, "Firing Instant", is the fifth exemplary embodiment shown in the example. The specific problem in determining the optimal firing instant for the system is that tripping should optimally occur at a specific time (for instance 30 ms) before the instant at which the passenger has been moved out of his or her normal sitting position by a predetermined distance. A tripped air bag requires a certain amount of time, for instance before it is fully inflated and only then can it effectively protect the passenger. Very soon thereafter, the air bag collapses again and loses its protective effect. The air bag should thus be fired neither too early, nor too late, but just at the right time for the passenger to fall into the air bag that has just then been fully inflated. The block 5 accordingly checks, for instance on the basis of one or more threshold values assigned to it, whether or not it is already too late to trip the system.

The block 5 should accordingly have the ability to draw conclusions from accelerations that have already occurred during a crash, as to the future course of that crash. This can be achieved by developing and optimizing this block in such a way that typical acceleration courses, which are derived from crash tests, are recognized as correctly as possible when they appear in reality. To this end, according to the invention, the block 5 can process the signal in such a way that it band-pass filters the sensor output signal and integrates it twice, for example. In this way, a further signal can be generated. With various weighting of the band-pass filtered sensor output signal, this further signal includes both the signal after the first integration and the signal after the second integration, and is especially well suited for vehicle-specific optimization of the instant of tripping of the system, with the normal tripping point being attained when a predetermined threshold value is attained.

It should be noted in passing that according to the invention, in a control unit for controlling the system, even more types of accidents can be distinguished, such as a broadside collision, a rear-end collision, or a free fall off a precipice. This could be achieved, for instance, by incorporating even more, suitably constructed and dimensioned evaluation circuits in addition to the evaluation circuits 2, 3 and 4 shown in the drawing, into the example.

The blocks 11, 31, 41, 51, "Time Windows", serve to retain a report on a detected event for a predetermined period of time, but also to limit this report in terms of length of time. This is achieved by the fact that in the event of a crash, a plurality of decisions from the blocks 1-5 coincide temporally correctly in such a way that tripping of the system is enabled through linking elements. On the other hand, it is in fact also advantageous to cancel signals in the time windows after a predetermined length of time, in order to avoid misrepresentation of a state that is not actually correct. The applicable durations should be selected as more or less different for each evaluation circuit, and should also depend on the applicable vehicle type.

In order to illustrate the importance of the time windows, the following course can be mentioned: The vehicle strikes an obstacle. The crash progresses in such a way that first the vehicle is gradually slowed down, for instance during which the passenger is already shifting forward. Then the vehicle is abruptly stopped by the obstacle. Known control units would trip the air bag at this point, because of the abruptness. However, in this case, the air bag should not in fact be tripped, because it would hit the passenger too late and in the face. At this time, which is much too late, it would no longer protect the passenger, but instead would only endanger him even further. Such dangers can be avoided by means of the time windows. The "Time window" blocks can even be constructed as a monostable multivibrator, if one goal is to keep the expense low.

The "Tripping Circuit" block is an electronic circuit that in the present example activates the system whenever one of the two following sets of conditions is met:
1st set The "Crash Recognition" block 1 signals an ongoing crash.

The "Discrimination" block 2 which distinguishes between head-on and oblique collisions has detected typical features of a head-on collision.

The "Fire/Not-fire" block 3 which determines if a head-on collision tripping threshold been exceeded signals that the tripping threshold has been exceeded.

The optimal firing instant is attained.

2nd set

The "Crash Recognition" block 1 signals an ongoing crash.

The "Discrimination" block 2 which distinguishes between head-on and oblique collisions has detected typical features of an oblique collision.

The "Fire/Not-fire" block 4 which determines if a oblique collision tripping threshold been exceeded signals that the tripping threshold has been exceeded.

The optimal firing instant is attained.

The "Tripping Circuit" block can, for instance, be an electronic circuit that conducts an adequate current pulse through the primer cap of an air bag, causing the primer cap to detonate.

The parallel evaluation circuits 1-5 accordingly produce binary output signals in this case. The "true" state of the evaluation circuits 1, 3, 4, 5 favors or reinforces tripping of the system in accordance with requirements 1, 3 and 4 listed above. Their signals are varied through the time windows or timing circuits 11, 31, 41, 51 in such a way that a useful temporal overlap among the "true" states of the various signals can occur. In further detail, this may take the following form:

For evaluation by requirement 1

The "true" state of the output signal of the evaluation circuit 1 is prolonged by a certain period of time by the timing element 11, for instance so that even brief pauses in acceleration or deceleration during an accident are spanned. This is equivalent to the function of a turn-off delay.

For evaluation by the requirements 3 and 4

The evaluation circuits 3, 4 and 5 will have the output state of "true" for the entire further duration of the accident, depending on the severity of the accident. In order to prevent possible overly late firing because of an excessive, accident-caused shifting forward of the passenger, the "true" states can be temporally limited by the following timing elements 31, 41, 51. This is equivalent to the function of monostable multivibrators. The timing circuit may also include such multivibrators, as an example.

The evaluation by the requirement 2 produces a plurality of output signals depending on the number of accident types to be distinguished among, and thus on the number of evaluation circuits in accordance with the requirement 3. In the example shown in this case in the drawing, this number is two in each instance. The output signals of the applicable evaluation circuit 2 enable the output signals of one of the evaluation circuits 3 and 4 at a time, through the AND linkages 23, 24.

The outcomes of this enablement are linked together again through an OR linkage 234. The output signal of this linkage 234 is referred to below as a tripping enablement.

The tripping enablement and the output signals of the evaluation circuits 1 and 5 are also linked together by an AND linkage 12345 in accordance with the requirements 1 and 4. The output signal of this linkage 12345 is used for triggering the tripping circuit.

Formulated in general terms, the following Boolean equation is obtained for ascertaining the outcome, while taking the aforementioned four requirements into account:

(output signal of timing element 11 per requirement 1)
AND
(((enable signal x by evaluation circuit 2 per requirement 2)
AND
(output signal of timing element x1 of evaluation circuit x per requirement 3/accident type x))
OR
...
OR
((enable signal y by evaluation circuit 2 per requirement 2)
AND
(output signal of timing element y1 of evaluation circuit y per requirement 3/accident type y)))
AND
(output signal of timing element 51 of evaluation circuit 5 per requirement 4)

The analog and logic functions described above can also be attained in suitably digitized form with a memory-programmed computer, for instance a microcomputer. The computer then simulates all, or at least some, of the functions of the evaluation circuits, such as 1-5, and optionally their time windows as well, such as 11, 31, 41, 51, and the linkage elements 23, 24, 234, 12345.

We claim:

1. A control unit for a passenger safety system for vehicles, comprising:
    at least one acceleration or deceleration sensor for generating at least one electronic analog output signal corresponding to accelerations or decelerations acting upon an applicable installation site in a vehicle, the at least
    one sensor output signal having a course corresponding to the time-dependent course of the respective accelerations or decelerations,
    at least one evaluation circuit having outputs and having an input connected to said at least one acceleration or deceleration sensor for evaluating the at least one sensor output signal to determine if threshold values are exceeded,
    a tripping circuit for tripping at least one passenger-protection component of the system if at least one of said threshold values is exceeded,
    means for subjecting each of the at least one sensor output signal to a plurality of different evaluations by supplying the at least one sensor output signal to at least one of said at least one evaluation circuit, each of said at least one evaluation circuit having means for evaluating said time-dependent course by different criteria and by a plurality of differently defined threshold values, at least one of said at least one evaluation circuit having means for using typical features of the time-dependent course supplied to it and a defined threshold value assigned to it to distinguish between accidents of at least two different types to which differently defined threshold values for the severity of the accident are assigned, at least one of said at least one evaluation circuit having means for ascertaining the severity of the type of accident individually assigned to it from said typical features of the time-dependent course supplied to it and from at least one of said threshold values assigned individually to it, at least one logic element for forming a linking function, said logic element having inputs connected to the outputs of said at least one evaluation circuit for linking applicable evaluation outcomes and having an output supplying the linking function to said tripping circuit, said linking function of said at least one logic element tripping the tripping circuit only if evaluations by the various criteria show a defined type of accident from a plurality of defined accident types, and if the at least one threshold value having been specifically assigned to the applicable type of accident has been exceeded, and at least one of said at least one evaluation circuit having means for ascertaining an optimal tripping instant derived from the time-dependent course output signal of said at least one sensor, said optimal tripping instant differing from an instant at which exceeding of the tripping threshold value is ascertained.

2. The control unit according to claim 1, wherein the at least one passenger-protection component of the system is selected from the group consisting of an air bag, a belt tensioner and a collapsible roll bar.

3. The control unit according to claim 1, wherein said at least one acceleration or deceleration sensor has a piezoresistive sensor element.

4. The control unit according to claim 1, wherein said at least one acceleration or deceleration sensor has an analog/digital converter for digitizing an originally analog sensor output signal.

5. The control unit according to claim 1, wherein at least one of said at least one evaluation circuit performs an operation of evaluating according to differing criteria, and said sensor signal subjecting means supplies the at least one sensor output signal to said at least one evaluation circuit performing the evaluating operation.

6. The control unit according to claim 1, wherein said sensor signal subjecting means supplies the at least one sensor output signal to a plurality of said evaluation circuits operating differently from one another.

7. The control unit according to claim 1, wherein said distinguishing means distinguishes between accidents selected from the group consisting of head-on, oblique, broadside and rear-end accidents.

8. The control unit according to claim 1, wherein at least one of said at least one logic element is at least one AND gate.

9. The control unit according to claim 8, wherein at least one of said at least one evaluation circuit has means for distinguishing signal curves typical of an accident from other signal curves by using the time-dependent course, and means for enabling the evaluation outcome of at least one other of said at least one evaluation circuit to be passed on to said tripping circuit through said at least one AND gate.

10. The control unit according to claim 8, wherein at least one of said at least one logic element is an OR gate for sending outcomes of evaluation to said tripping circuit in OR-linked form permitting the tripping circuit to be alternatively tripped by all OR-linked evaluation outcomes.

11. The control unit according to claim 9, wherein at least one of said at least one logic element is an OR gate for sending outcomes of evaluation to said tripping circuit in OR-linked form permitting the tripping circuit to be alternatively tripped by all OR-linked evaluation outcomes.

12. The control unit according to claim 1, including at least one timing circuit connected following of at least one of said at least one evaluation circuit, said tripping circuit being connected to said at least one timing element for permitting tripping and feeding of the output signal of said at least one evaluation circuit to said tripping circuit only within certain time windows.

13. The control unit according to claim 1, wherein said at least one evaluation circuit is at least one suitably memory-programmed computer.

14. The control unit according to claim 12, wherein said at least one timing circuit is at least one suitably memory-programmed computer.

15. The control unit according to claim 1, wherein said at least one logic element is at least one suitably memory-programmed computer.

16. The control unit according to claim 12, wherein said at least one evaluation circuit and said at least one timing circuit and said at least one logic element are part of at least one suitably memory-programmed computer.

* * * * *